United States Patent [19]

Matera

[11] Patent Number: 5,551,132
[45] Date of Patent: Sep. 3, 1996

[54] COUPLING ARRANGEMENT

[75] Inventor: Pasquale Matera, Plainview, N.Y.

[73] Assignee: Milton L. Klein, Bronx, N.Y.

[21] Appl. No.: 520,019

[22] Filed: Aug. 28, 1995

[51] Int. Cl.$^6$ ...................................................... A44B 9/18
[52] U.S. Cl. ........................... 24/708; 24/708.6; 24/709.2; 24/711.3; 24/DIG. 29; 24/653
[58] Field of Search ............................ 24/279, DIG. 29, 24/708, 708.5, 708.1, 708.6, 709.2, 711.3, 598.2, 598.3, 684, 653

[56] References Cited

U.S. PATENT DOCUMENTS

| | | | |
|---|---|---|---|
| 1,682,585 | 8/1928 | Waller | 24/709.2 |
| 2,162,820 | 6/1939 | Morehouse | 24/709.2 X |
| 2,902,304 | 9/1959 | Smith | 24/653 X |
| 3,230,594 | 1/1966 | Smith | 24/653 |
| 4,503,591 | 3/1985 | Adamska-Koperska | 24/27 X |
| 4,679,961 | 7/1987 | Stewart | 24/653 X |

FOREIGN PATENT DOCUMENTS

| | | | |
|---|---|---|---|
| 317332 | 12/1919 | Germany | 24/653 |
| 455907 | 10/1936 | United Kingdom | 24/279 |

*Primary Examiner*—Peter M. Cuomo
*Assistant Examiner*—Hanh Tran
*Attorney, Agent, or Firm*—Bernard J. Murphy

[57] ABSTRACT

A shaft, having a slot formed therein offset from the shaft axis, receives the terminal end of a limb within the slot. The limb end has a pointed termination, and a bight. The slot has an arcuately formed portion, in which to nest the bight, and a depression in which to receive the pointed termination. More, the shaft has threading formed thereon, adjacent the slot, with the slot traversing the threads and a shaft-end head. An internally-threaded sleeve is slidably engaged with the shaft, and overlies the slot-nested end of the limb, and threadedly fastens onto the shaft threads, to prevent the limb from removing from the shaft.

9 Claims, 2 Drawing Sheets

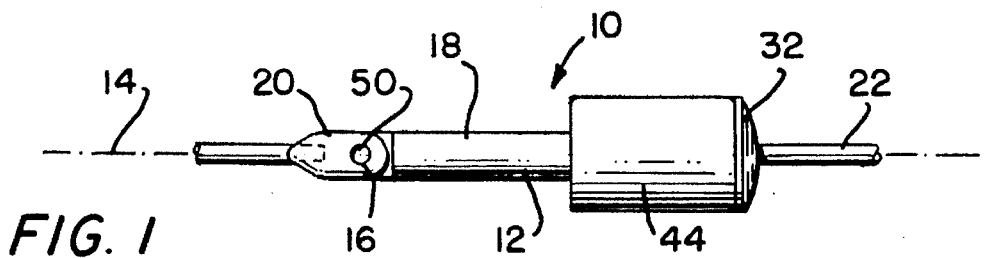
FIG. 1
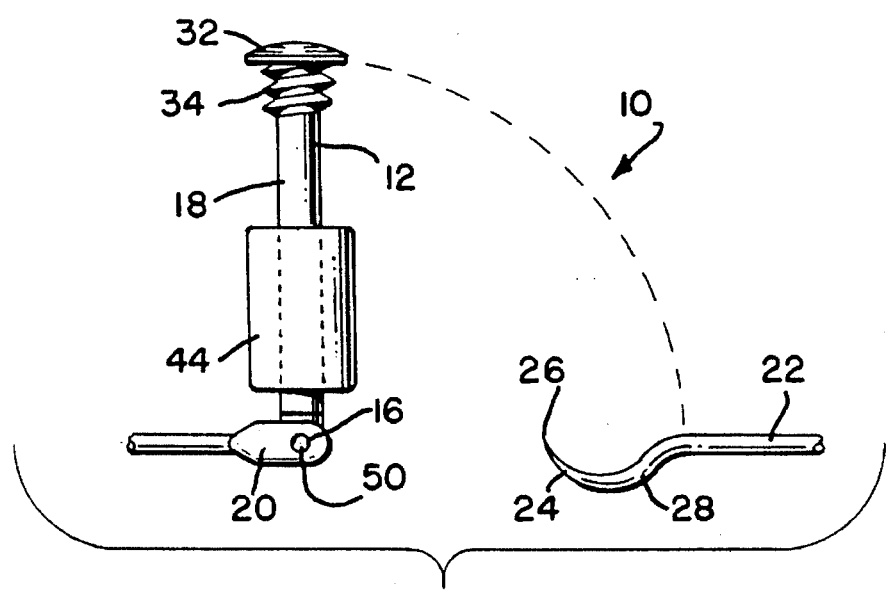
FIG. 2
FIG. 4
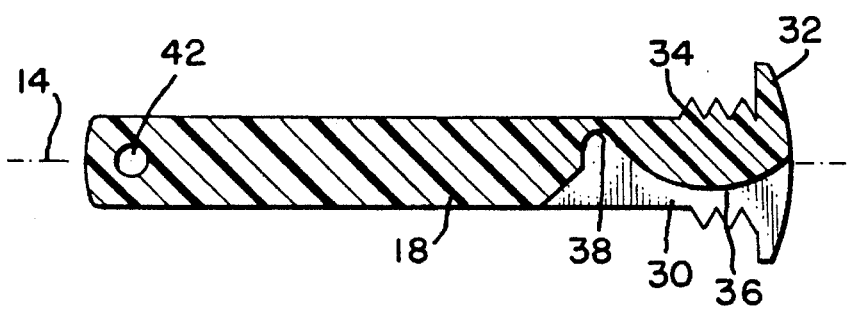
FIG. 5
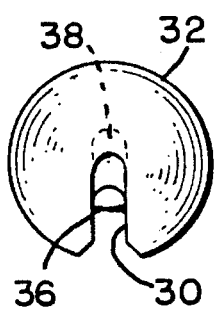
FIG. 3
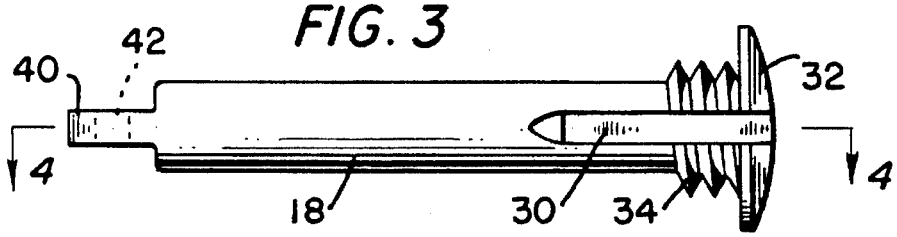

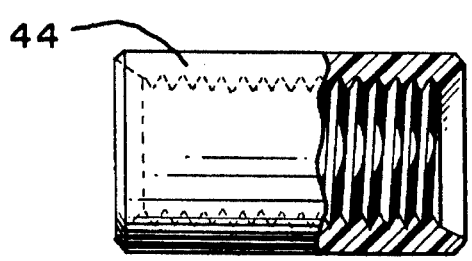 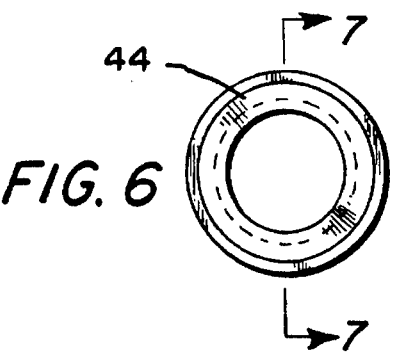 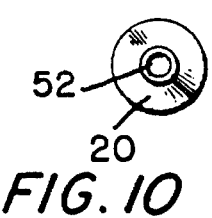 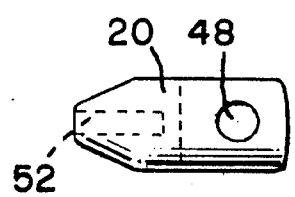 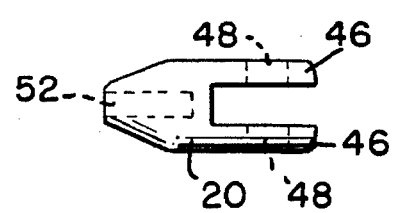 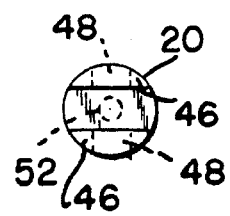 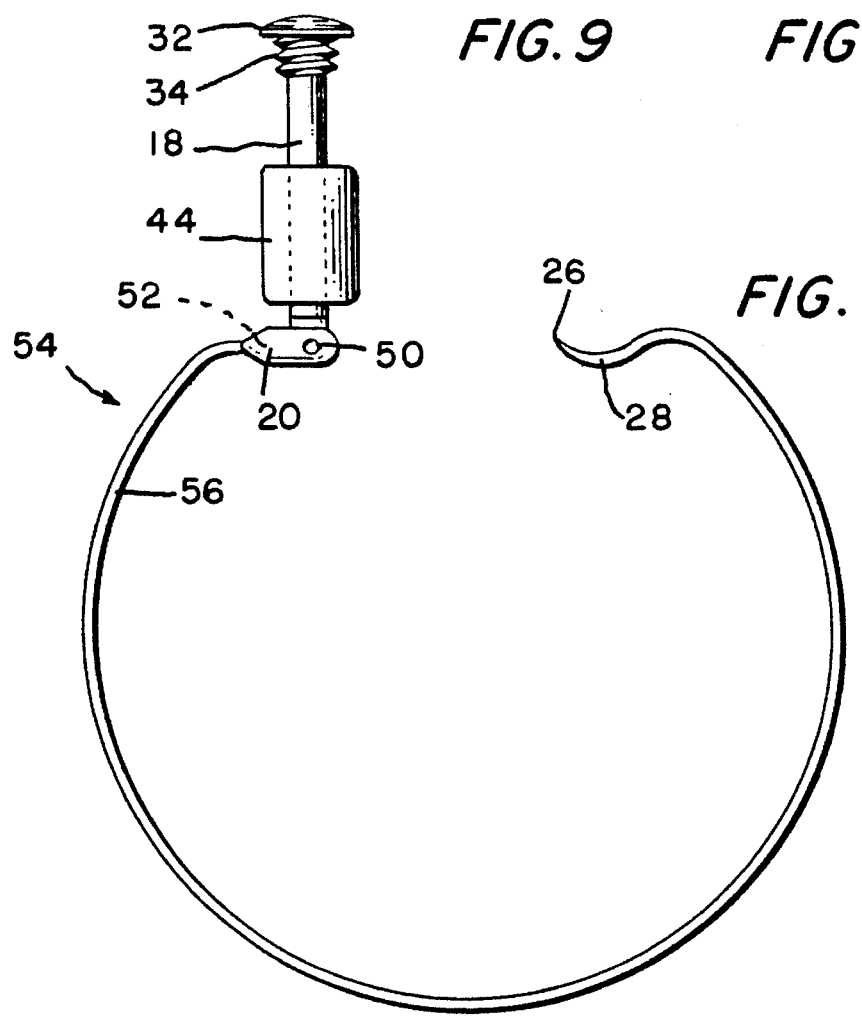

COUPLING ARRANGEMENT

This invention pertains to couplings for lockingly attaching a first element to a second element, and in particular to such a coupling which is useful for lockingly attaching opposite ends of a band or the like to each other in order that the band can suspend articles therefrom and secure the articles from removal from the band.

Particularly, it is an object of this invention to set forth a coupling arrangement comprising a limb having a terminal end; and a shaft assembly having a longitudinal axis; wherein said shaft assembly has means, offset from said axis, for nesting said terminal end of said limb therein; and means, movably coupled to said shaft assembly, for releasably locking said terminal end of said limb in said nesting means.

Further objects of this invention, as well as the novel features thereof, will become more apparent by reference to the following description, taken in conjunction with the accompanying figures, in which:

FIG. 1 is a side elevational view of the novel coupling arrangement, according to an embodiment thereof, the same being shown in a closed configuration;

FIG. 2 is a side elevational view of the embodiment of FIG. 1; here the arrangement is shown in an open configuration;

FIG. 3 is an enlarged, plan view of the shaft of the shaft assembly;

FIG. 4 is a cross-sectional view taken along section 4—4 of FIG. 3;

FIG. 5 is a end view taken from the right-hand end of FIG. 4;

FIG. 6 is an end view of the sleeve;

FIG. 7 is a cross-sectional view taken along section 7—7 of FIG. 6;

FIG. 8 is a side view of the link;

FIG. 9 is a plan view of the link;

FIG. 10 is an end view of the link taken from the left-hand end of FIG. 8;

FIG. 11 is an end view of the link taken from the right-hand end of FIG. 9; and

FIG. 12 is a side elevational view of a sock pairer embodiment of the invention the same incorporating the novel coupling arrangement.

As shown in the figures, the novel coupling arrangement 10 comprises a shaft assembly 12 having a longitudinal axis 14. The shaft assembly 12 has an articulated joint 16 in that the assembly comprises a shaft 18 and a link 20, the two being pivotably joined together. In addition, the arrangement comprises a limb 22 having a terminal end 24 with a pointed termination 26 and a bight 28 in immediate adjacency to the termination 26.

The shaft 18 is shown in enlarged detail in FIGS. 3, 4 and 5. The shaft 18 has a slot 30 formed therein, an enlarged head 32 at one end thereof, and is externally threaded, at 34, the threading extending from under the head 32 toward an intermediate portion of the shaft 18. As can be seen, the slot 30 traverses the threading and the head 32 of the shaft 18. The slot 30 has an arcuate portion 36 which corresponds, in form, to the bight 28, and a depression 38.

The end of the shaft 18 which is opposite the slotted end has a tongue 40 with a pivot pin hole 42 formed therethrough. Too, the shaft 18 slidably carries thereon a sleeve 44 which, as FIGS. 6 and 7 depict, is internally threaded with threading matching the threading of shaft 18.

The link 20, variously shown in FIGS. 8, 9, 10 and 11, has a bifurcation 46 with a traversing pivot pin hole 48. The tongue 40 is received in the bifurcation 46 and with the pin holes 42 and 48 in alignment, the latter receive therein the pivot pin 50 to define the articulated joint 16. The end of the link 20 which is opposite the bifurcation 46 has a blind hole 52 formed therein to receive an end of a limb similar to limb 22.

In the closed configuration of the arrangement 10, as shown in FIG. 1, the pointed termination 26 is received in the depression 38, and the bight 28 is nested in the arcuate portion 36 of the slot 30. Then, the sleeve 44 is drawn up to the threaded portion 34 of the shaft 18 and threaded up tight against the head 32. By this means, the limb 22 is locked in the shaft assembly 12. To release the limb 22, that is, to open the coupling arrangement 10, it is necessary only to unthread the sleeve 44 from the threaded portion 34 of the shaft 18, slide the sleeve 44 away from the threaded end of the shaft 18, and swing the shaft 18 and sleeve away from the limb 22, as is shown in FIG. 2.

In the closed configuration of FIG. 1 in which it can be seen that the outside diameters of the head 32 and sleeve 44 are the same, and the sleeve 44 abuttingly interfaces the head 32, it will be evident that the limb 22 cannot be withdrawn from the shaft assembly 12 because the sleeve 44 will not allow the bight 28 and the pointed termination 26 to rise from the slot 30. The sleeve 44 must first be unthreaded from the shaft 18 and slid along the latter before the shaft can be swung up away from the limb 22.

Clearly, the coupling arrangement 10 will have multiple uses, but in particular, it will serve admirably as a sock palter, as shown in FIG. 12. Such a sock pairer 54 is shown therein, the same incorporating a circular wire band 56 which is formed of stainless steel. One end of the band 56 is fixed to the link 20 via the blind hole 52, whereas the opposite end thereof is integral with the limb 22. The link end of the band 56 can be cemented in the hole 52, or fused therein, or pinned. Clearly, the pointed termination 26 will pierce the fabric of the socks, and a plurality of pairs of socks, or the like, can be moved along the band 56. In that the band 56 is formed of stainless steels and the pin 50 as well, and the fact that the remaining components are formed of a plastic, the coupling arrangement 10, and its configuration as a sock pairer 54, can be used in washing machines and dryers without rusting or causing the socks, or whatever, to suffer any damage. Even so, the coupling arrangement 10 and the sock pairer 54 are virtually indestructable. As the threaded sleeve 44 and the threaded shaft 18 are formed of plastic, the engagement of the sleeve 44 with the shaft 18 manifests a substantial frictional grasp; upon the sleeve 44 being torqued firmly onto the threads of the shaft 18, the same will not disengage in a washing machine or dryer.

While I have described my invention in connection with specific embodiments thereof, it is to be clearly understood that this is done only by way of example, and not as a limitation to the scope of the invention, as set forth in the objects thereof, and in the appended claims.

I claim:

1. A coupling arrangement, comprising:

a limb having a terminal end; and a shaft assembly having a longitudinal axis; wherein said shaft assembly has means, offset from said axis, for nesting said terminal end of said limb therein; and means, movably coupled to said shaft assembly, for releasably locking said terminal end of said limb in said nesting means; wherein said shaft assembly comprises a dual-ended shaft;

said shaft has an enlarged head at one end thereof;

said shaft further has an externally-threaded portion formed thereon extending between said head and an intermediate portion thereof; and said nesting means comprises a slot formed in said shaft which traverses said externally-threaded portion of said head.

2. A coupling arrangement, according to claim 1, wherein:

said shaft assembly has an articulated joint.

3. A coupling arrangement, according to claim 1, wherein:

said locking means comprises a sleeve, slidably engaged with said shaft, and having threading which is complementary to said externally-threaded portion of said shaft formed therein.

4. A coupling arrangement, according to claim 3, wherein:

said head has a given outside diameter;

said sleeve has an outside diameter which is the same as said given diameter; and said sleeve comprises means for enclosing therein all of said slot excepting the portion of said slot which traverses said head.

5. A coupling arrangement, according to claim 1, wherein:

said shaft assembly further comprises a link; and one end of said shaft and said link are pivotably coupled together.

6. A coupling arrangement, according to claim 5, wherein:

said link has a bifurcation;

said one end of said shaft has a tongue;

said tongue is set in said bifurcation; and a pivot pin penetrates said bifurcation and said tongue.

7. A coupling arrangement, according to claim 5, further including:

a band; wherein one end of said band is fixed to said link; and the opposite end of said band is integral with said limb.

8. A coupling arrangement, according to claim 1, wherein:

said terminal end of said limb comprises (a) a pointed termination, and (b) a bight in immediate adjacency to said termination.

9. A coupling arrangement, according to claim 8, wherein:

said slot has an arcuate portion corresponding in form to said bight, and a depression in which to receive said pointed termination.

* * * * *